Patented Dec. 4, 1923.

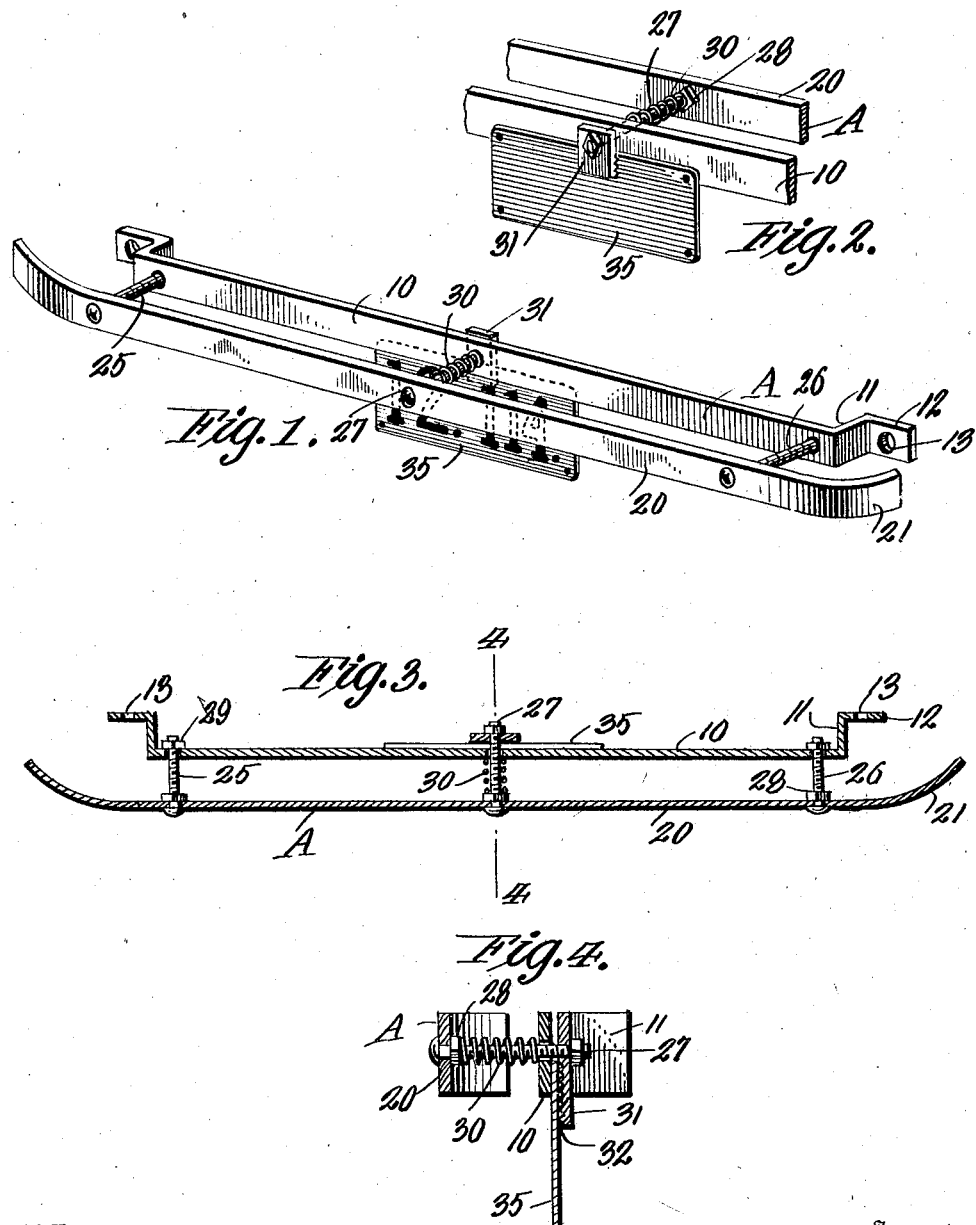

1,476,625

UNITED STATES PATENT OFFICE.

WILLIAM H. LEONARD, OF SAN ANTONIO, TEXAS.

AUTO ACCIDENT IDENTIFIER.

Application filed March 8, 1923. Serial No. 623,809.

*To all whom it may concern:*

Be it known that I, WILLIAM H. LEONARD, a citizen of the United States, residing at San Antonio, in the county of Bexar and State of Texas, have invented certain new and useful Improvements in an Auto Accident Identifier, of which the following is a specification.

This invention relates to means for identifying drivers of vehicles in case of accidents and the like and the primary object of the invention is to identify careless and reckless drivers who run down pedestrians and escape by not stopping, and to make it possible to positively identify the automobile and drivers in case of an accident.

Another prime object of the invention is to provide means for releasably holding an identification plate on an automobile in such a manner, so that in case of a collision or the like the said identifying plate will be dropped upon the road or street and thus provide positive means for identifying an automobile in case the driver thereof fails to stop after such collision or accident.

A further prime object of the invention is to provide a combined bumper and license or identifying holding plate, the license plate or identifying tag holder being so constructed that when the bumper comes forcibly in contact with any extraneous objects, the said license plate or identifying tag will be dropped upon the roadway.

A still further object of the invention is to provide an improved device of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawings, in which drawings:

Figure 1 is a perspective view of the improved automobile identifying appliance.

Figure 2 is a fragmentary perspective view of the rear portion of the appliance.

Figure 3 is a horizontal longitudinal section through the same.

Figure 4 is a transverse section through the improved appliance taken on the line 4—4 of Figure 3 illustrating the clamp for holding the license tag or other identifying tag in place.

Referring to the drawings in detail, wherein similar reference characters designate corresponding parts throughout the several views, the letter A generally indicates the improved automobile identifying device which embodies a supporting bar 10, and a sliding releasing bumper bar 20. These bars 10 and 20 are preferably made of nickeled metal either flat or round in cross section. The supporting bar 10 is provided with rearwardly extending arms 11 terminating in right angularly extending attaching feet 12, which are preferably disposed in parallel relation to the bar 10. These attaching feet 12 are provided with apertures 13 to permit the same to be bolted or otherwise secured to an ordinary bumper or to the vehicle chassis.

The front releasing and bumper bar 20 is normally arranged in spaced parallel relation to the supporting bar 10 and has its terminals arcuated rearwardly as at 21 and extended beyond the ends of the supporting bar 10. The releasing bumper bar 20 is slidably connected to the supporting bar 10 by means of end bolts 25 and 26 and an intermediate bolt 27. As shown these bolts 25, 26 and 27 are firmly clamped to the front releasing bumper bar 20 by means of nuts or the like 28 threaded upon the said bolts into intimate contact with the inner surface of the said bumper and releasing bar 20. The end bolts 25 and 26 have threaded on their terminals in engagement with the contact supporting bar 10, holding nuts 29.

In order to insure the correct spacing of the releasing and bumper bar 20 in relation to the supporting bar 10, a relatively heavy expansion spring 30 is coiled about the intermediate bolt 27 and is adapted to engage the opposite faces of the bars 10 and 20. The central bolt 27 rearwardly of the supporting bar 10 carries a clamping jaw or plate 31, the inner surface of which is serrated or provided with biting teeth 32. This clamping plate or jaw 31 forms means for firmly holding an identification tag or license plate 35 on the supporting bar and it can be seen that the license or identifying plate 35 is firmly gripped between the bar 10 and the said clamping plate or jaw 31.

Now in use of the improved appliance, the same is connected to the ordinary bumper or to the vehicle chassis by means of the feet 12, and when a person or other extraneous object is forcibly hit by the releasing and bumper rod 20, the same will be forced inwardly against the tension of the spring 30 which will move the clamping jaw plate 31 rearwardly therewith and thus release the identification or license plate 35 and allow the same to drop upon the ground. It is obvious that if the driver does not stop that the plate can be picked up and thus permit positive identification of the automobile.

If the driver fails to stop after an accident, his number plate is of course left on the ground and the car can be identified by it, if he stops his car and gets out and comes back and picks up the plate, this will give ample time for bystanders to take his number and otherwise identify the driver, so that there will be no mistake in identifying the number of the machine or person driving the same. In all probability however, the driver knowing this will not try to escape.

I also contend that the attaching of the device on a car will teach drivers to stay the proper distance from other cars in driving and make drivers more careful in the operation of their vehicles, which will lessen accidents and convert reckless drivers into careful ones.

Changes in details may be made without departing from the spirit or the scope of this invention.

What I claim as new is:

1. An automobile identification device comprising a main supporting bar adapted to be attached to an automobile, a sliding bumper plate supported by the supporting bar, means normally holding the sliding bumper plate in spaced parallel relation to the supporting bar, a clamp connected with the bumper bar for sliding movement therewith and adapted to engage the rear face of the supporting bar, a license plate arranged to be clamped between the clamping plate and the rear face of the supporting bar, whereby upon inward movement of the bumper bar the said clamping plate will be moved from out of engagement with the license plate and supporting bar, as and for the purpose specified.

2. In an automobile identifying device, in combination with a supporting bar, means carried by the bar to permit the attaching thereof to an automobile, a sliding bumper bar associated with the supporting bar, a clamping plate carried by the bumper bar for sliding movement therewith, resilient means for normally holding the bumper bar in spaced relation to the supporting bar and the clamping plate in engagement with the rear face of the supporting bar, and an identification plate adapted to be normally clamped between the rear face of the supporting bar and said clamping plate.

3. In an automobile identifying device, the combination with a supporting bar, means carried by the bar for permitting the connection thereof to a vehicle, a bumper bar disposed in parallel relation to the supporting bar, rigid bolts carried by the bumper bar and slidably supported by the supporting bar, a clamping jaw carried by one of said bolts and disposed outwardly of the supporting bar, an expansion spring coiled about one of said bolts for normally urging the bumper bar in spaced relation to the supporting bar and the clamping plate in engagement with the supporting bar, and an identification tag adapted to be clamped between the clamping plate and supporting bar.

W. H. LEONARD.

Witnesses:
W. C. WHITE,
D. SELBY,
B. G. JOHNSON.